(12) United States Patent
Keith, Jr.

(10) Patent No.: US 9,501,374 B2
(45) Date of Patent: *Nov. 22, 2016

(54) DISASTER RECOVERY APPLIANCE

(71) Applicant: Microsoft Technology Licensing, LLC, Redmond, WA (US)

(72) Inventor: Robert O. Keith, Jr., Modesto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/608,002

(22) Filed: Jan. 28, 2015

(65) Prior Publication Data

US 2015/0143161 A1    May 21, 2015

Related U.S. Application Data

(63) Continuation of application No. 13/645,262, filed on Oct. 4, 2012, now Pat. No. 8,977,887, which is a continuation of application No. 11/977,983, filed on Oct. 26, 2007, now Pat. No. 8,307,239.

(51) Int. Cl.
| | |
|---|---|
| *G06F 11/00* | (2006.01) |
| *G06F 11/20* | (2006.01) |
| *G06F 11/14* | (2006.01) |

(52) U.S. Cl.
CPC ......... *G06F 11/203* (2013.01); *G06F 11/1451* (2013.01); *G06F 11/1456* (2013.01); *G06F 11/2023* (2013.01); *G06F 11/2035* (2013.01); *G06F 11/2038* (2013.01); *G06F 11/2046* (2013.01); *G06F 11/1469* (2013.01); *G06F 11/2097* (2013.01); *G06F 2201/815* (2013.01)

(58) Field of Classification Search
CPC .................................................. G06F 11/1456
USPC .......... 714/4.11, 4.1, 2, 11–13, 5.1, 5.11, 6.3
See application file for complete search history.

(56) References Cited

U.S. PATENT DOCUMENTS

| | | | |
|---|---|---|---|
| 5,204,897 A | 4/1993 | Wyman | |
| 5,930,357 A | 7/1999 | Fukui | |
| 6,898,286 B2 | 5/2005 | Murray | |
| 7,577,431 B2 | 8/2009 | Jiang | |
| 7,703,142 B1 | 4/2010 | Wilson et al. | |
| 8,244,864 B1 | 8/2012 | Bahl et al. | |
| 8,307,239 B1 * | 11/2012 | Keith, Jr. ............ | G06F 11/1456 714/2 |
| 8,977,887 B2 * | 3/2015 | Keith, Jr. ............ | G06F 11/1456 714/4.11 |
| 2004/0025018 A1 | 2/2004 | Haas et al. | |
| 2005/0192035 A1 | 9/2005 | Jiang | |

* cited by examiner

*Primary Examiner* — Dieu-Minh Le
(74) *Attorney, Agent, or Firm* — Thomas Wong; Doug Barker; Micky Minhas

(57) ABSTRACT

A disaster recovery appliance is described herein. The disaster recovery appliance is coupled to one or more servers. The disaster recovery appliance continuously receives backup data for each of the one or more servers. When a server fails, the disaster recovery appliance, replaces the failed server. While the failed server is inaccessible, the disaster recovery appliance is able to mimic the functionality of the failed server. In some embodiments, the disaster recovery appliance is able to act as a server in addition to a backup device for the other servers.

26 Claims, 8 Drawing Sheets

DISASTER RECOVERY APPLIANCE

RELATED APPLICATION(S)

The present application is a continuation of co-pending U.S. patent application Ser. No. 13/645,262, filed on Oct. 4, 2012, and entitled "DISASTER RECOVERY APPLIANCE," which is a continuation of U.S. patent application Ser. No. 11/977,983, filed Oct. 26, 2007, and entitled "DISASTER RECOVERY APPLIANCE," now issued as U.S. Pat. No. 8,307,239, which are both hereby incorporated by reference.

FIELD OF THE INVENTION

The present invention relates to the field of computing. More specifically, the present invention relates to the field of implementing a disaster recovery appliance.

BACKGROUND OF THE INVENTION

A typical network requires the use of one or more servers to store, distribute and process data. Furthermore, the network typically implements a backup system to save data in the event a server loses data whether it be due to a virus, software issue or hardware failure. Although the data is backed up, that does not remedy the problem of the server being inaccessible as a result of a malfunction. Once a server fails, an administrator has to replace the server with another server which is a process that could take a few hours or days if a new server needs to be purchased. With a server down, data stored on that server is likely inaccessible which causes problems such as a website being unavailable. It has been estimated that millions of dollars are lost due to system inaccessibility. Furthermore, there is a significant effect on reputation when a company's website is down. Moreover, for Local Area Networks (LANs) within an organization, a server being down would halt productivity if employees are unable to access their data.

A solution of ensuring that the server data is continuously available is to utilize a dedicated backup server for each server. While that works well with one server, it becomes a high cost solution with multiple servers as each server typically costs many thousands of dollars.

Another common feature when utilizing networks is Lights Out Management (LOM) which allows a system administrator to monitor and manage servers remotely. A typical LOM system includes a hardware component called a LOM module and an application for monitoring system variables such as temperature and CPU utilization. The application also provides the system administrator with remote abilities such as rebooting, fan speed control, troubleshooting and operating system installation. Although LOM provides some remote management abilities, there are many issues that LOM is unable to handle.

SUMMARY OF THE INVENTION

A disaster recovery appliance is described herein. The disaster recovery appliance is coupled to one or more servers. The disaster recovery appliance continuously receives backup data for each of the one or more servers. When a server fails, the disaster recovery appliance, replaces the failed server. While the failed server is inaccessible, the disaster recovery appliance is able to mimic the functionality of the failed server. In some embodiments, the disaster recovery appliance is able to act as a server in addition to a backup device for the other servers.

In one aspect, a system for providing network stability and data reliability comprises one or more servers and a computing device coupled to the one or more servers, wherein the computing device backs up data from the one or more servers and replaces a failed server in the one or more servers. The computing device replaces the failed server upon detecting a condition indicating the first server is about to fail. The computing device is a server and a backup device. The computing device uses a continuous backup scheme to back up the data. The computing device stores a system image of each of the one or more servers. The computing device is coupled to the one or more servers over a network. The system further comprises a storage server coupled between the one or more servers and the computing device for backing up data. The computing device continues backing up data from active servers in the one or more servers after the failed server fails. The system further comprises a standby computing device coupled to the computing device to temporarily replace the failed server. The system further comprises a virtual server generated by the computing device to temporarily replace the failed server.

In another aspect, a method of providing network stability and data reliability comprises backing up data from one or more servers to a computing device and serving the data utilizing the computing device when a server of the one or more servers fails. Backing up data includes storing an image of the one or more servers. The method further comprises continuing to back up the data from active servers of the one or more servers on the computing device. The computing device backs up the data using a continuous backup scheme. The computing device is a server and a backup device. The computing device is coupled to the one or more servers over a network.

In another aspect, a method of providing network stability and data reliability comprises backing up data from one or more servers to a computing device and utilizing a standby computing device to temporarily replace a failed server of the one or more servers when the server fails. Backing up data includes storing an image of the one or more servers. The computing device backs up the data using a continuous backup scheme. The method further comprises generating a virtual server with the computing device to temporarily replace a failed second server if the standby computing device is unavailable. The method further comprises initializing the computing device into server mode to serve the data for a failed second server if the standby computing device is unavailable. The method further comprises continuing to back up data from the active servers of the one or more servers on the computing device.

In yet another aspect, an apparatus for providing network stability and data reliability comprises a storage component, a data backup application stored on the storage component for backing up data received from one or more servers, a data restore application stored on the storage component for restoring the data received from the one or more servers and a server application stored on the storage component for serving the data received from a failed server of the one or more servers. The data received comprises a server image. The data backup application and the data restore application continue executing while the server application is executing. The data backup application and the data restore application stop executing when the server application is executing.

In another aspect, a system for providing network stability and data reliability comprises one or more servers, a first computing device coupled to the one or more servers, wherein the first computing device backs up data from the one or more servers and replaces a failed server of the one or more servers and a second computing device coupled to the one or more servers and the first computing device, wherein the second computing device is coupled after the failed server failed, further wherein the second computing device backs up data from the one or more servers and the first computing device. The first computing device copies the data to the second computing device. The second computing device replaces a second failed server of the one or more servers and the first computing device.

DETAILED DESCRIPTION OF THE PREFERRED EMBODIMENT

Figure 1A:
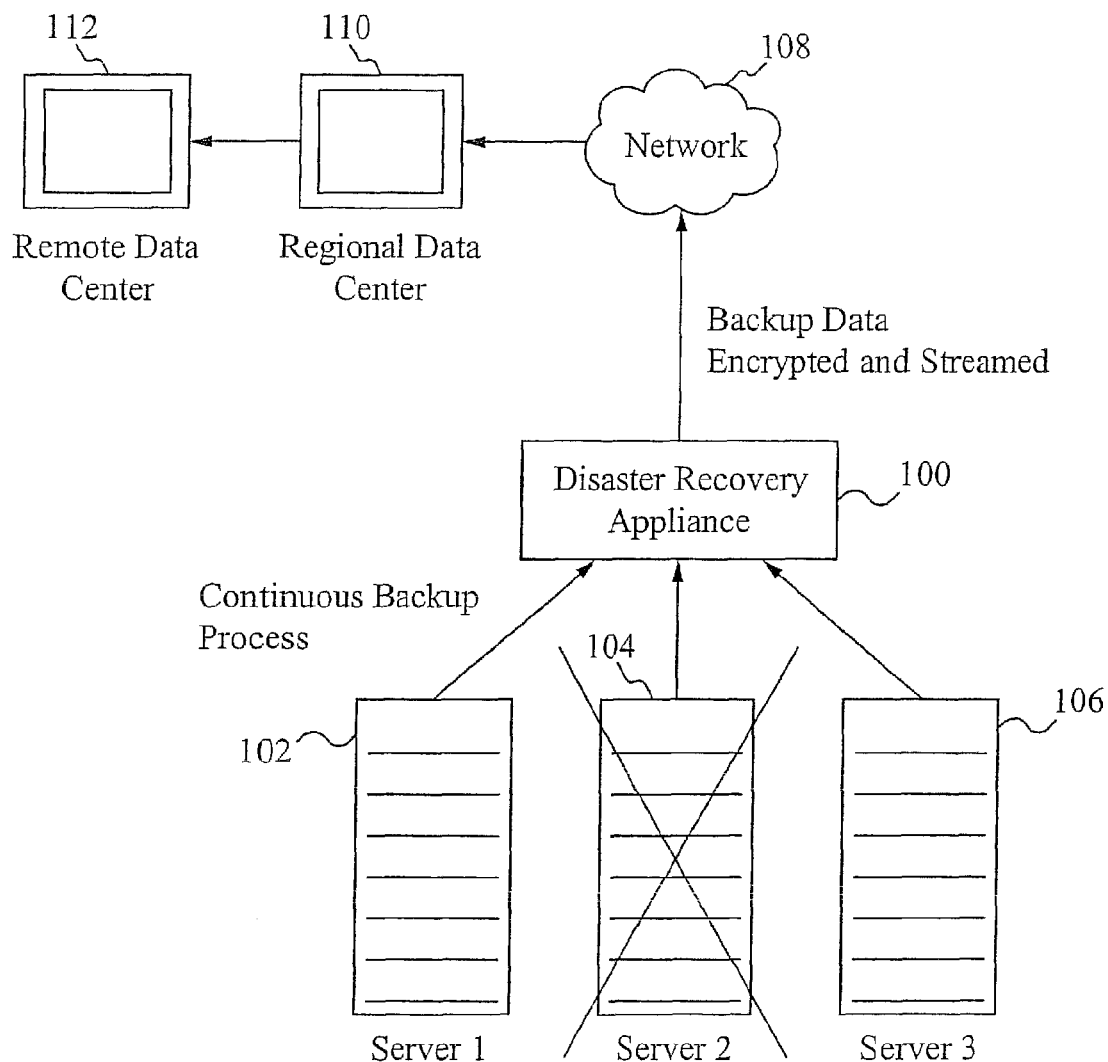
FIG. 1A illustrates a graphical representation of an embodiment of a server configuration with a disaster recovery appliance.

A disaster recovery appliance is described herein. A server configuration includes one or more servers in addition to a storage server or a backup server. In an embodiment, the disaster recovery appliance is coupled to the storage server. Using a continuous backup scheme, the one or more servers continuously back up their data on the storage server which then backs up the data on the disaster recovery appliance. The storage server stores all of the relevant application and user data corresponding to each server. The storage server also stores and is aware of the environment on each server. For instance, if one of the servers is a SQL server, the storage server contains the necessary software and/or image to replicate the SQL server. The disaster recovery appliance contains an operating system and utilities to back up and restore data when needed. Specifically, when one of the servers fails, the disaster recovery appliance is available to take the place of the failed server. The disaster recovery appliance becomes a temporary or permanent replacement server in real-time (e.g. instantaneously aside from set up time if any) so that the change is seamless.

As described herein, the storage server is aware of each server's environment, and thus is able to provide the disaster recovery appliance with the same environment as the faulty server. After the failed server becomes inaccessible, the disaster recovery appliance is able to mimic the actions and data contained on the failed server. Thus, when users attempt to access an application or data that is on the failed server, they will continue to access the data uninterrupted as if the failed server were up and running. In some embodiments, the disaster recovery appliance is the storage server. In some embodiments, the disaster recovery appliance couples to a network to receive backup data from the one or more servers. In some embodiments, the disaster recovery appliance is capable of backing up a single server, and in other embodiments, the disaster recovery appliance is capable of backing up more than one server. Furthermore, in some embodiments, once a server fails, the disaster recovery appliance is able to operate in dual modes such that the disaster recovery appliance continues to back up data from other servers, while the disaster recovery appliance also continues to serve data as the replacement server. In some embodiments, once a server fails, the disaster recovery appliance operates in a single mode of serving data, and the backup functionality is shut down.

By backing up data on a disaster recovery appliance, and then being able to switch from backup mode to server mode, a network utilizing the disaster recovery appliance is able to maintain full operation with an extremely short interrupt time from a failed server. Additional disaster recovery appliances are able to be coupled to a server system to provide additional backup capabilities. The disaster recovery appliance also utilizes plug-and-play technology so that it is able to be installed easily.

FIG. 1A illustrates a graphical representation of an embodiment of a server configuration with a disaster recovery appliance. A disaster recovery appliance 100 backs up data from servers 102, 104, 106. The servers 102, 104, 106 continuously back up data to the disaster recovery appliance 100. The disaster recovery appliance 100 is able to be any computing device with adequate features, but is preferably a server device with sufficient storage and computing capacity to mimic another server. In some embodiments, the backup is performed by taking snapshots or images of each of the servers 102, 104, 106 on a periodic basis, such as, every hour and transmitting the snapshots to the disaster recovery appliance 100. In other embodiments, the snapshots are taken more or less often depending on how critical the data is. Furthermore, the data is able to be backed up by means other than snapshots. The disaster recovery appliance 100 is any storage/server implementation such as a server with dedicated storage or a set of Redundant Array of Inexpensive Disks (RAIDs). Upon failure of a server such as the Server 2 104, the disaster recovery appliance 100 is able to enable a server mode, so that the disaster recovery appliance 100 also functions as a server. In addition to functioning as a server, the disaster recovery appliance 100 continues to back up data from the remaining active servers 102 and 106, in some embodiments. In embodiments where it is crucial to ensure that the backed up data is even more secure, the data is sent via a network 108 to a regional data center 110 and a remote data center 112. The regional data center 110 backs up the data in a location relatively near the servers 102, 104, 106, while the remote data center 112 is remotely stored to back up the data in case of an earthquake or other disaster that destroys data in one area but not in a remote area.

Figure 1B:
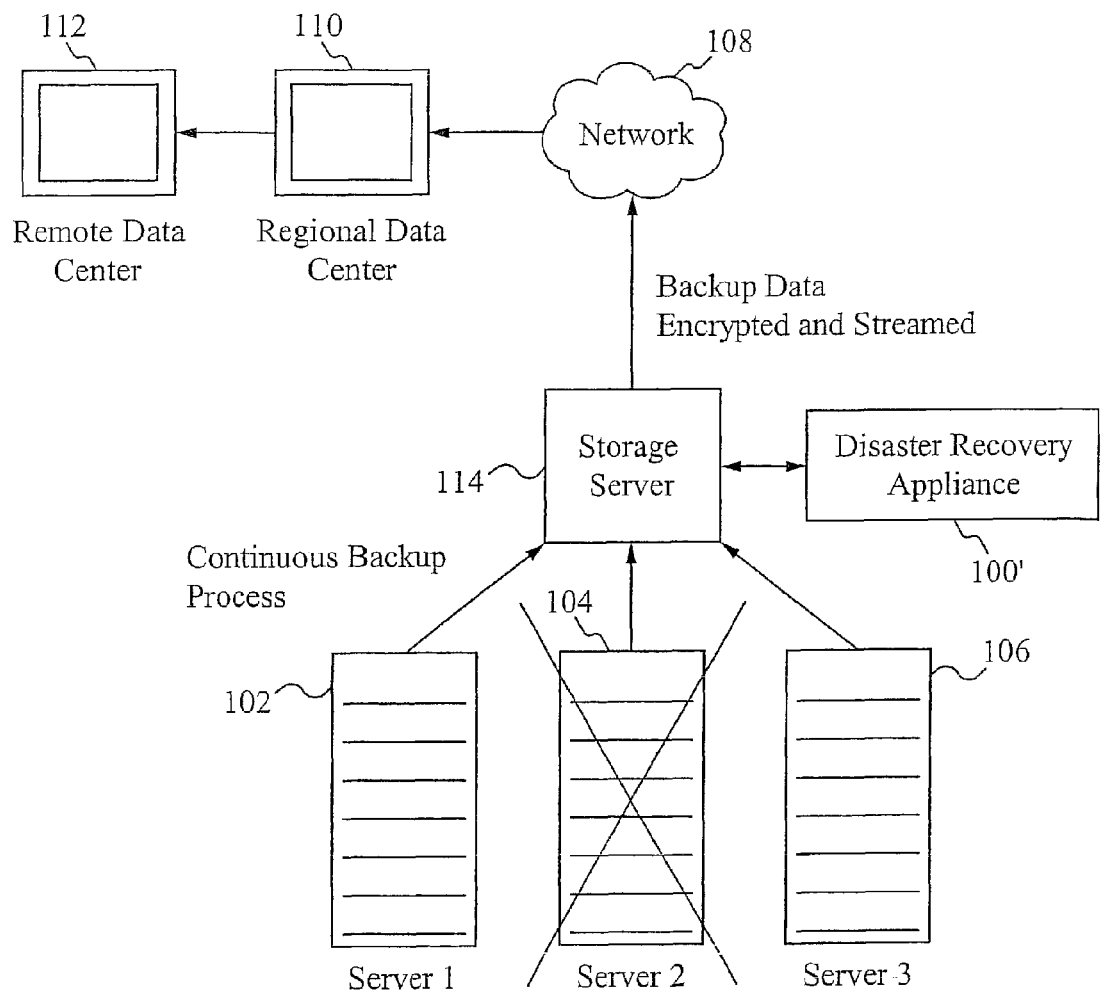
FIG. 1B illustrates a graphical representation of an embodiment of a server configuration with a disaster recovery appliance coupled through a storage server.

FIG. 1B illustrates a graphical representation of a server configuration with a disaster recovery appliance coupled through a storage server. As shown, the server 104 has failed and is inaccessible. A disaster recovery appliance 100' is coupled to the storage server 114 to replace the failed server 104. The disaster recovery appliance 100' is able to replace the faulty server 104 because the disaster recovery appliance 100' contains the configuration information and other data which was backed up on the storage server 114 and then sent to the disaster recovery appliance 100'. Since the disaster recovery appliance 100' appears to be the same entity as the faulty server 104, users who attempt to access data or applications on the faulty server 104 will not experience any issues. The disaster recovery appliance 100' acts the same as the faulty server 104 before it failed. In embodiments where it is crucial to ensure that the backed up data is secured not only once, but multiple times, the data is sent via a network 108 to a regional data center 110 and a remote data center 112.

Figure 1C:
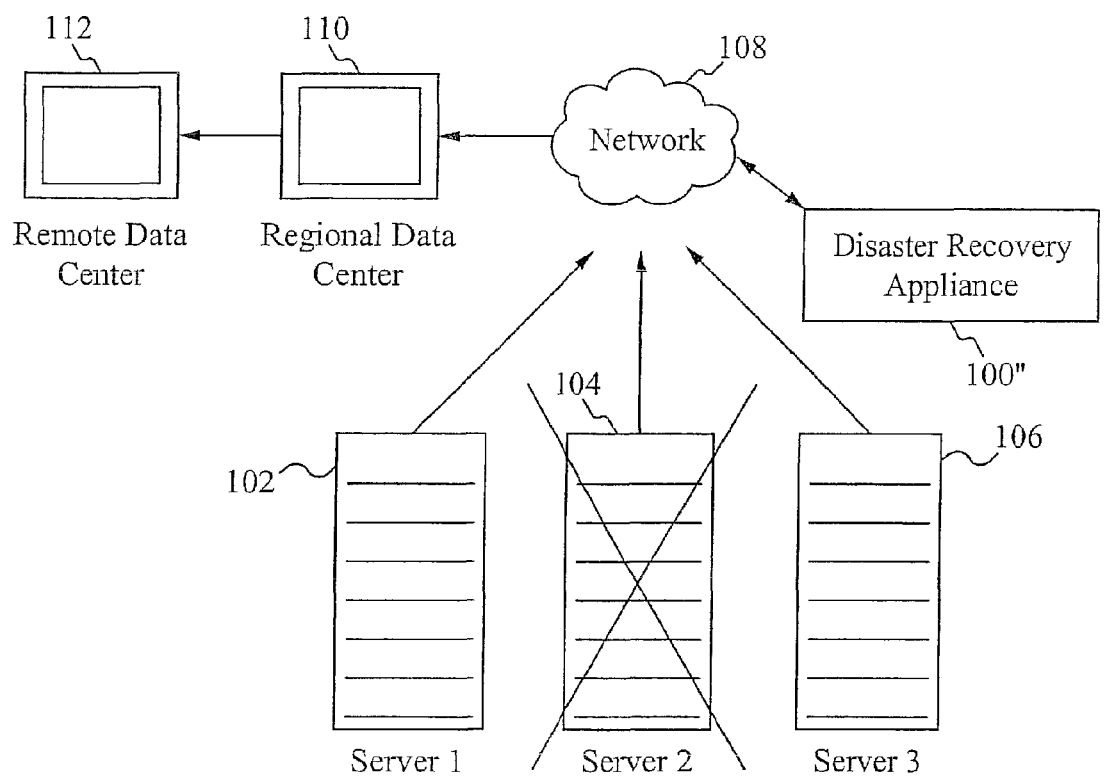
FIG. 1C illustrates a graphical representation of an embodiment of a server configuration with a disaster recovery appliance coupled over a network.

FIG. 1C illustrates a graphical representation of a server configuration with a disaster recovery appliance coupled over a network. As shown, the server 104 has failed and is inaccessible. A disaster recovery appliance 100" is coupled to the network 108 to replace the failed server 104. The disaster recovery appliance 100" is able to replace the faulty server 104 because the disaster recovery appliance 100" contains the configuration information and other data which was backed up on the disaster recovery appliance 100" over the network 108. Since the disaster recovery appliance 100" appears to be the same entity as the faulty server 104, users who attempt to access data or applications on the faulty server 104 will not experience any issues. The disaster recovery appliance 100" acts the same as the faulty server 104 before it failed. In embodiments where it is crucial to ensure that the backed up data is secured not only once, but multiple times, the data is sent via a network 108 to a regional data center 110 and a remote data center 112.

Figure 2:
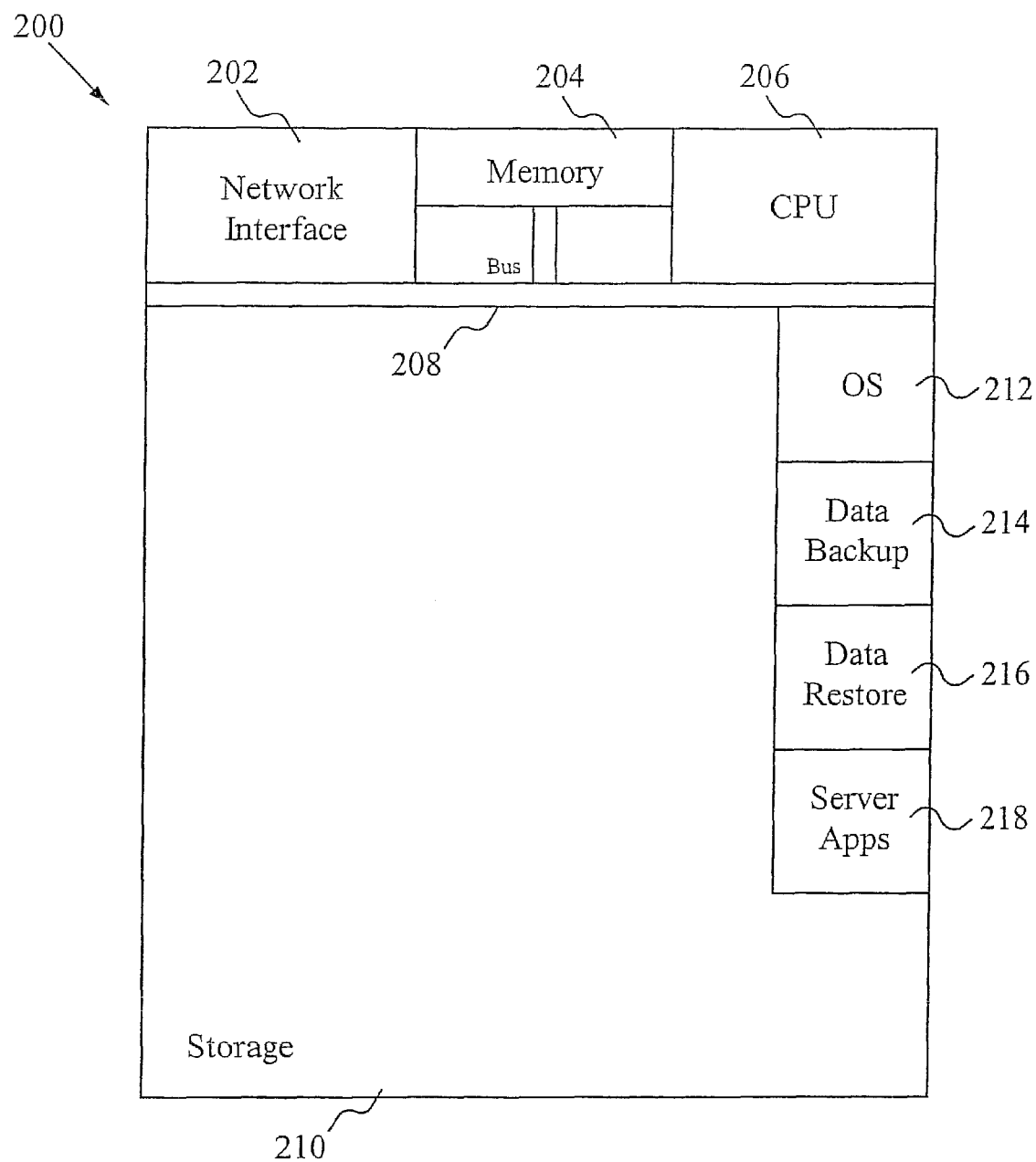
FIG. 2 illustrates a block diagram of a disaster recovery appliance.

FIG. 2 illustrates a block diagram of a disaster recovery appliance. A disaster recovery appliance 200 contains standard server components including a network interface 202, a memory 204, a central processing unit 206, a system bus 208 and storage 210 in addition to other standard computing components. Furthermore, the disaster recovery appliance 200 is able to have multiple of each of these components, for example, many servers have more than one central processing unit 206. The storage 210 is able to be any storage implementation such as a hard disk drive, RAID, or another form of storage. Contained within the storage is an operating system 212, application(s) for data backup 214, application(s) for data restore 216, and server applications 218 amongst other utilities for tasks such as partitioning.

Figure 3:
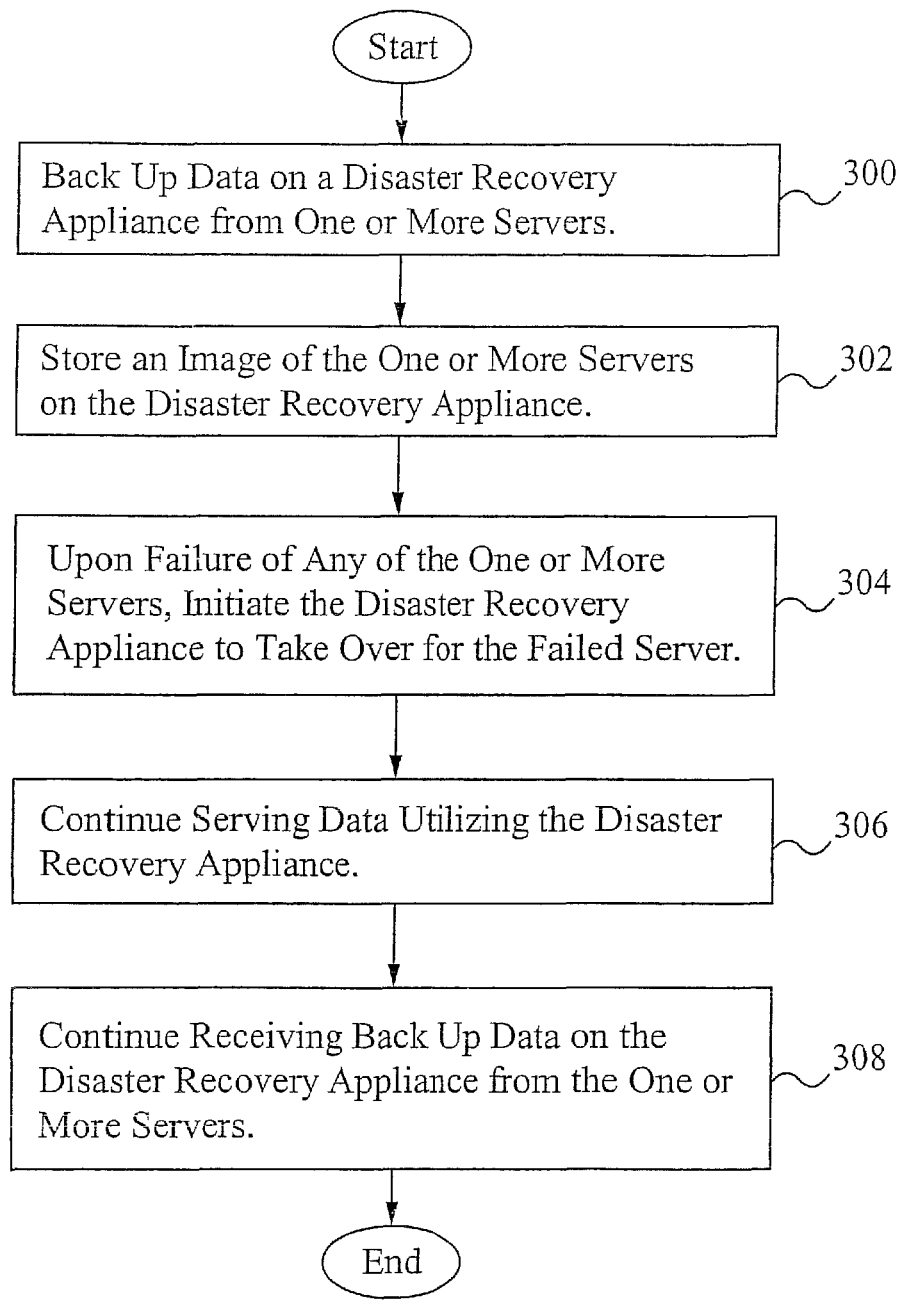
FIG. 3 illustrates a flowchart of a method of utilizing an embodiment of the disaster recovery appliance.

FIG. 3 illustrates a flowchart of a method of utilizing an embodiment the disaster recovery appliance. In the step 300, data is backed up on a disaster recovery appliance from the one or more servers. In the step 302, an image of each of the one or more servers is stored on the disaster recovery appliance. In some embodiments, the steps 300 and 302 are combined. Furthermore, in some embodiments where a storage server is utilized, the storage server also backs up the data from the one or more servers in addition to the disaster recovery appliance backing up the data. Upon failure of any of the one or more servers, the disaster recovery appliance is initiated to take over (e.g. serve data) for the failed server, in the step 304. The disaster recovery appliance is able to mimic the failed server using the image along with applications that have the ability to run the server. In the step 306, the disaster recovery appliance continues serving data. In some embodiments, in the step 308, the disaster recovery appliance continues receiving backup data from the one or more servers that did not fail. In some embodiments, the step 308 is omitted, and the disaster recovery appliance stops receiving backup data. Furthermore, in some embodiments, a single disaster recovery appliance is coupled to a single server to replace that server when the server fails. In some embodiments, the process automatically occurs; whereas, in other embodiments an administrator initiates and maintains the process. In some embodiments, the disaster recovery appliance is capable of replacing more than one failed server by containing the necessary software, hardware and configuration.

In some embodiments, for mission critical operations where the amount of down-time must be as close to 0 seconds as possible, additional components are able to be used to ensure down-time is minimized. In addition to backing up data such as user data and/or applications on a disaster recovery appliance and then serving the data using the disaster recovery appliance, the data is able to be served using a virtual server and/or a warm standby device. The virtual server is described in U.S. patent application Ser. No. 11/644,451 filed Dec. 21, 2006, entitled, "Virtual Recovery Server," which is also incorporated by reference herein. The warm standby appliance is described in U.S. patent application Ser. No. 11/644,581 filed Dec. 21, 2006, entitled, "Warm Standby Appliance," which is also incorporated by reference herein. Although, these additional components are able to be included to further ensure a minimal down-time, it is possible to have minimal down-time simply using the disaster recovery appliance.

Figure 4:
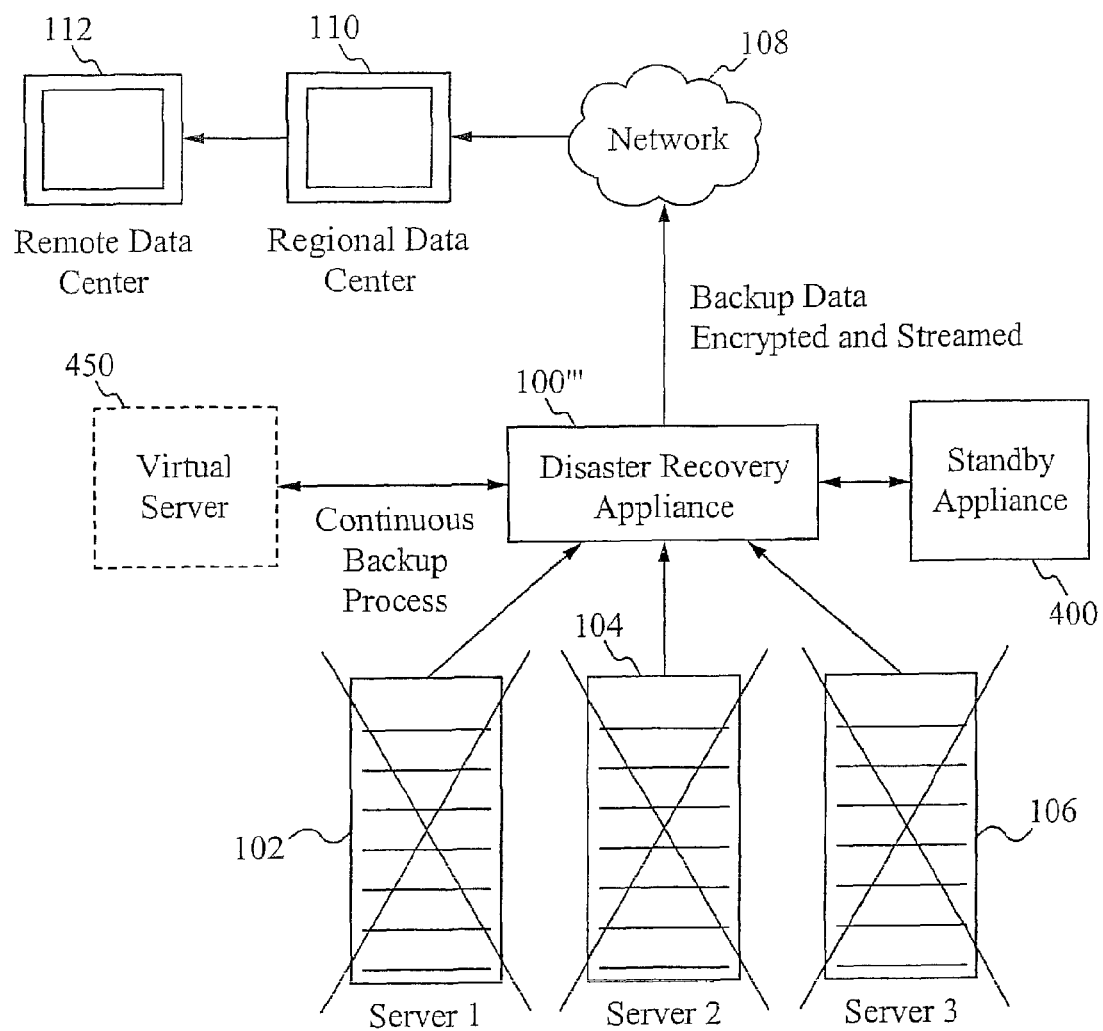
FIG. 4 illustrates a graphical representation of an embodiment of a server configuration with a disaster recovery appliance, a standby appliance and a virtual server.

FIG. 4 illustrates a graphical representation of an embodiment of a server configuration with a disaster recovery appliance, a standby appliance and a virtual server. In some embodiments, a disaster recovery appliance 100''' is able to function similar to a storage server wherein the disaster recovery appliance 100''' backs up data and is able to generate a virtual server 450 and send data to a standby appliance 400. Furthermore, the disaster recovery appliance 100''' also has its capabilities of being able to mimic a failed server. The disaster recovery appliance 100''' is coupled to the one or more servers 102, 104, 106. The disaster recovery appliance 100''' couples to a regional data center 110 and a remote data center 112 through a network 108 as described above. The disaster recovery appliance 100''' is also coupled to the warm standby appliance 400. The warm standby appliance 400 is available when one of the servers 102, 104, 106 fails, as is shown in the example, assuming Server 2 104 failed first. When one warm standby appliance is utilized, then any failed servers beyond one would not be protected using the warm standby appliance 400. Therefore, a virtual server 450 is able to be generated from the disaster recovery appliance 100''', for example, if Server 3 106 fails after Server 2 104 failed. The Server 2 104 is being mimicked by the warm standby appliance 400 when Server 3 106 fails. Since the warm standby appliance 400 is preoccupied/unavailable, the disaster recovery appliance 100''' generates a virtual server 450 to represent the Server 3 106. The virtual server 450 is generated using the image of the failed server, specifically the Server 3 106. Thus, using the combination of the warm standby appliance 400 and the virtual server 450, even with multiple server failures, the network is able to continue functioning as if there were no issues from the user's perspective. Furthermore, if there is another failure, for example, the Server 1 102 fails as well, while the standby appliance 400 and the virtual server 450 are preoccupied/unavailable, then the disaster recovery appliance 100''' is able to be used as the replacement for the Server 1 102. Therefore, even when all 3 main servers have failed, through the backups available, the system is able to continue functioning.

Although only one warm standby appliance and only one virtual server are described above, any number of warm standby appliances and virtual servers are able to be implemented. For example, for a large company with fifty servers where the absolute minimum downtime is required, the company may have two warm standby appliances and the ability to generate multiple virtual servers in case many servers fail at roughly the same time. Furthermore, although a warm standby appliance and a virtual server are described above as both being part of the system, it is possible to use one or more warm standby appliances without a virtual server, or to use one or more virtual servers without a warm standby appliance.

Figure 5:
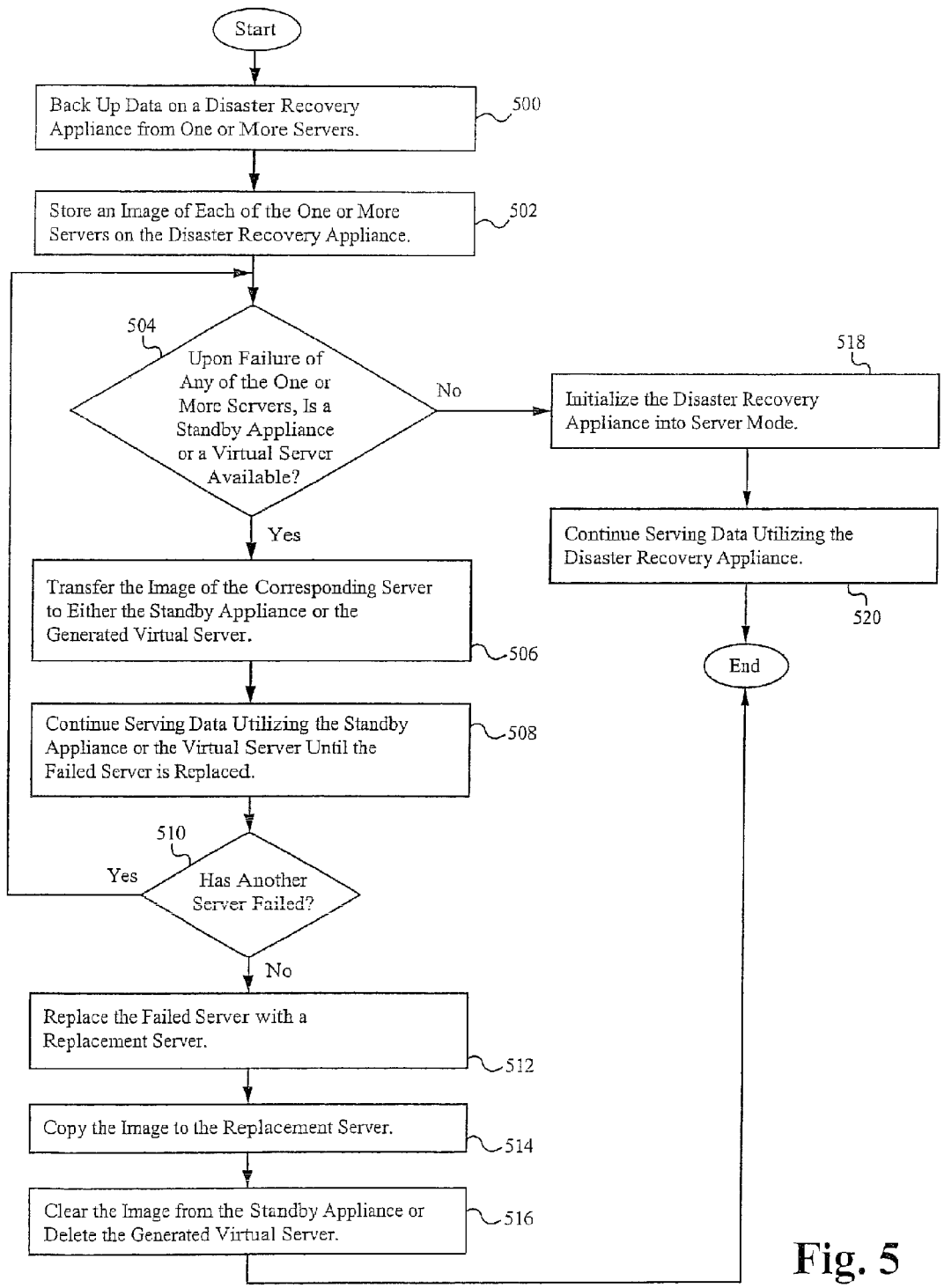
FIG. 5 illustrates a flowchart of a method of utilizing an embodiment of the disaster recovery appliance.

FIG. 5 illustrates a flowchart of a method of utilizing an embodiment of the disaster recovery appliance. In the step 500, data is backed up on a disaster recovery appliance from the one or more servers. In the step 502, an image of each of the one or more servers is stored on the disaster recovery appliance. In some embodiments, the steps 500 and 502 are combined. In alternative embodiments, another backup mechanism is utilized to backup the data from the one or more servers. Upon failure of any of the one or more servers, it is determined if a warm standby appliance or a virtual server is available in the step 504. If it is determined that a warm standby appliance or a virtual server is available in the step 504, then the image of the corresponding server is transferred to the warm standby appliance or the virtual server in the step 506. Preferably, the warm standby appliance is utilized first and then a virtual server is generated for subsequent failed servers. The warm standby appliance or the virtual server is able to mimic the failed server using the image along with applications that have the ability to restore and run the server. In the step 508, the warm standby appliance or the virtual server continues serving data until the failed server is replaced. In the step 510, it is determined if another server has failed. If another server has failed, then the process returns to the step 504. If another server has not failed since the previous server failed, then in the step 512, the failed server is replaced with a replacement server. In the step 514, the image on the warm standby appliance or the virtual server is copied to the replacement server for another smooth transition. The warm standby appliance is then cleared or the virtual server is deleted, in the step 516, so that it is able to mimic another failed server later on.

If in the step 504, a warm standby appliance is not available and a virtual server is not able to be generated to replace the failed server, then the disaster recovery appliance is initialized into server mode, in the step 518. In the step 520, the disaster recovery appliance continues serving data. The system is continuously backing up data in addition to monitoring for server failures. Therefore, when a server does fail, the system is able to adapt and utilize the necessary resources whether they be one or more warm standby appliances, one or one or more virtual servers and/or one or more disaster recovery appliances. In some embodiments, the process automatically occurs; whereas, in other embodiments an administrator maintains the process.

Figure 6:
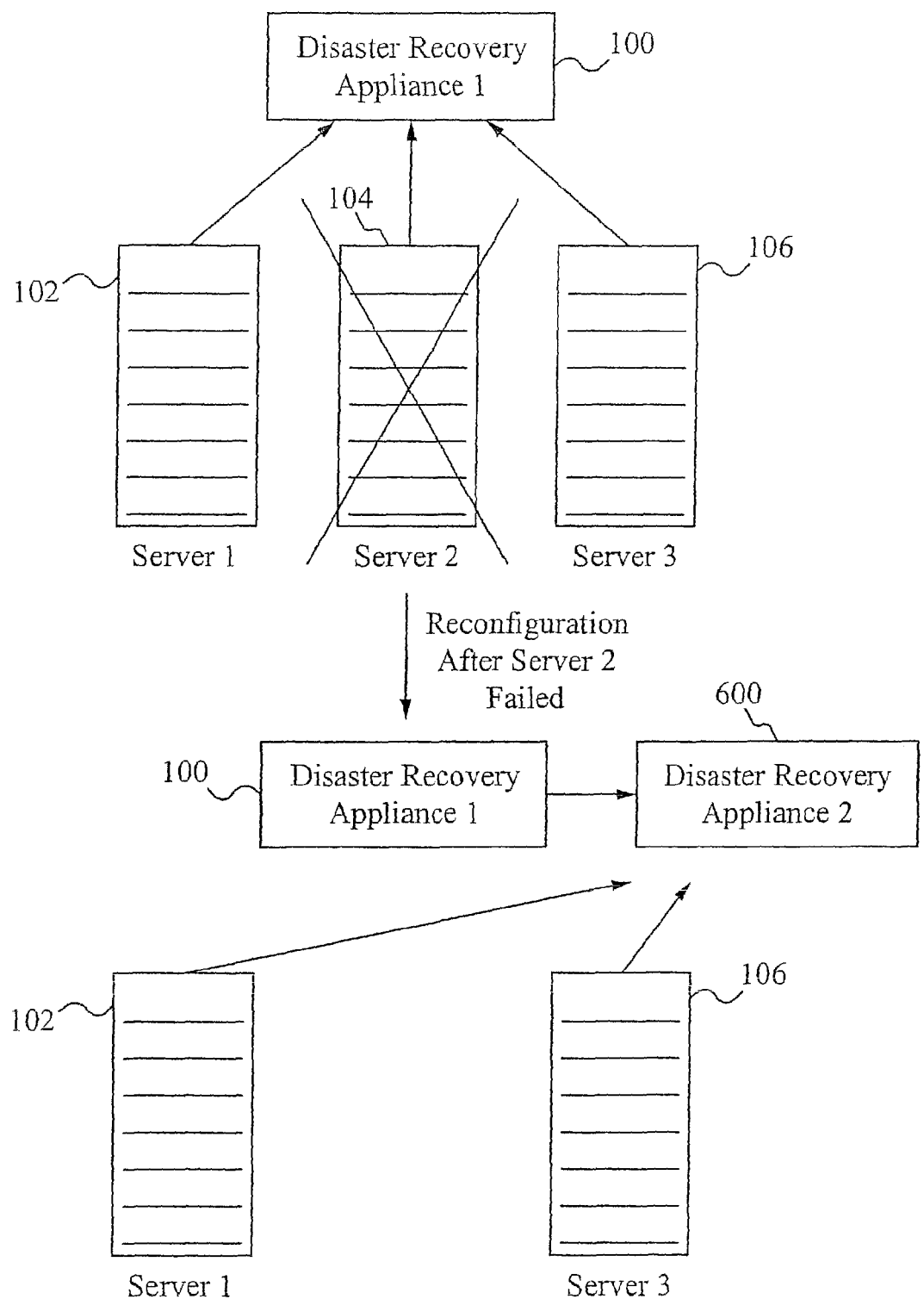
FIG. 6 illustrates a graphical representation of an embodiment utilizing multiple disaster recovery appliances.

FIG. 6 illustrates a graphical representation of an embodiment utilizing multiple disaster recovery appliances. A first disaster recovery appliance 100 backs up data for all of the servers 102, 104, 106 coupled to the first disaster recovery appliance 100. However, when a server fails such, as the Server 2 104, the first disaster recovery appliance 100 replaces that failed server as described above. In some embodiments, the first disaster recovery appliance 100 continues to back up data for the other active servers 102, 106. Then, when a second disaster recovery appliance 600 is installed into the system, the second disaster recovery appliance 600 is coupled to the first disaster recovery appliance 100 and is then able to receive the backed up data from the first disaster recovery appliance 100. The remaining active servers 102, 106 are also coupled to the second disaster recovery appliance 600 so that it is able to continue backing up the data. In some embodiments, the second disaster recovery appliance 600 is also able to back up data from the first disaster recovery appliance 100 which at this point is now functioning as a server like the servers 102, 106. This configuration allows a single disaster recovery appliance to back up data for many servers but take the place of only one.

The disaster recovery appliance is utilized by coupling a disaster recovery appliance to a storage server wherein the storage server then transfers server images to the disaster recovery appliance periodically. Alternatively, the disaster recovery appliance is directly coupled to one or more data/application servers to back up the data and/or applications and then when a server fails, the disaster recovery appliance replaces the failed server. The disaster recovery appliance is updated often with captured images of the servers, so that minimal data is lost if a server were to fail. The disaster recovery appliance is then able to mimic the functional server after the server fails, and the disaster recovery appliance remains the replacement server. Thus, from a customer or user perspective, there will be little downtime affecting the user's interaction with the server.

In operation, the disaster recovery appliance provides a permanent disaster recovery appliance when a server fails. One or more servers operate by serving data to users, where serving includes hosting a website, providing/storing data, executing applications or anything a server is capable of doing. Furthermore, each of these servers typically has a dedicated task or at least partitioned tasks, so that one server may be deemed an SQL server while another is focused on a different aspect of serving. In some embodiments, a storage or backup server is utilized to back up these servers which then sends the backup data to the disaster recovery appliance. In some embodiments, the servers are directly coupled to the disaster recovery appliance, and in some embodiments, the servers are coupled to the disaster recovery appliance through a network. The data and/or application backups are performed utilizing any backup technology but preferably receiving images of each server. When one or more of the servers fails, the disaster recovery appliance takes the place of that server. Therefore, the server is only down for a very short amount of time while the disaster recovery appliance takes over. Once the disaster recovery appliance is running, users should experience no difference than if the server were still running. In some embodiments, the disaster recovery appliance continues backing up data from the active servers in addition to acting as a server.

In addition to utilizing the disaster recovery appliance when a server has failed, the disaster recovery appliance is able to detect when a server is about to fail, so that the disaster recovery appliance starts taking over the serving processes before the server fails. With such a detection, it is possible to have zero downtime. A failing server is able to be detected in a number of ways such as by monitoring the system environment. For example, if the server's internal temperature is reaching a dangerously high temperature, that is an indicator that the server is about to shut down, and thus the disaster recovery appliance should take over. Other methods of detecting a failing server are possible.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A system for providing network stability and data reliability, comprising:
   a. one or more servers;
   b. a computing device coupled to the one or more servers, the computing device comprising a memory, wherein the computing device backs up data from the one or more servers on the memory and upon failure of one or more of said servers, replaces the failed server: and
   c. a data restore application stored on the memory for restoring the data received from the one or more servers.

2. The system as claimed in claim 1 wherein the computing device replaces the failed server upon detecting a condition indicating that one of the one or more servers is about to fail.

3. The system as claimed in claim 1 wherein the computing device is a server and a backup device.

4. The system as claimed in claim 1 wherein the computing device uses a continuous backup scheme to back up the data.

5. The system as claimed in claim 1 wherein the computing device stores a system image of each of the one or more servers.

6. The system as claimed in claim 1 wherein the computing device is coupled to the one or more servers over a network.

7. The system as claimed in claim 1 further comprising a storage server coupled between the one or more servers and the computing device for backing up data.

8. The system as claimed in claim 1 wherein the computing device continues backing up data from active servers in the one or more servers after the failed server fails.

9. The system as claimed in claim 1 further comprising a standby computing device coupled to the computing device to temporarily replace the failed server.

10. The system as claimed in claim 1 further comprising a virtual server generated by the computing device to temporarily replace the failed server.

11. A method of providing network stability and data reliability, comprising:
   a. backing up data from one or more servers to a memory resident on a computing device;
   b. serving the data utilizing the same computing device when a failed server of the one or more servers fails; and
   c. restoring the data received from the failed server with a data restore application stored on the memory.

12. The method as claimed in claim 11 wherein backing up data includes storing an image of the one or more servers.

13. The method as claimed in claim 11 further comprising continuing to back up the data from active servers of the one or more servers on the computing device.

14. The method as claimed in claim 11 wherein the computing device backs up the data using a continuous backup scheme.

15. The method as claimed in claim 11 wherein the computing device is a server and a backup device.

16. The method as claimed in claim 11 wherein the computing device is coupled to the one or more servers over a network.

17. A method of providing network stability and data reliability, comprising:
   a. backing up data from one or more servers to a memory resident on a computing device;
   b. utilizing the same computing device to temporarily replace a failed server of the one or more servers when the server fails; and
   c. restoring the data received from the failed server with a data restore application stored on the memory.

18. The method as claimed in claim 17 wherein backing up data includes storing an image of the one or more servers.

19. The method as claimed in claim 17 wherein the computing device backs up the data using a continuous backup scheme.

20. The method as claimed in claim 17 further comprising generating a virtual server with the computing device to temporarily replace a failed second server if the computing device is unavailable.

21. The method as claimed in claim 17 further comprising initializing the computing device into server mode to serve the data for a failed second server if the computing device is unavailable.

22. The method as claimed in claim 21 further comprising continuing to back up data from the active servers of the one or more servers on the computing device after failure of the failed second server.

23. An apparatus for providing network stability and data reliability, comprising:
   a. a storage component resident on a computing device;
   b. a data backup application stored on the storage component for backing up data received from one or more servers;
   c. a data restore application stored on the storage component for restoring the data received from the one or more servers; and
   d. a server application stored on the storage component for serving the data received from a failed server of the one or more servers.

24. The apparatus as claimed in claim 23 wherein the data received comprises a server image.

25. The apparatus as claimed in claim 23 wherein the data backup application and the data restore application continue executing while the server application is executing.

26. The apparatus as claimed in claim 23 wherein the data backup application and the data restore application stop executing when the server application is executing.

* * * * *